US007003296B2

(12) United States Patent
de Montgolfier

(10) Patent No.: US 7,003,296 B2
(45) Date of Patent: Feb. 21, 2006

(54) METHOD OF SIGNALING COMPRESSED MODE PARAMETERS TO A MOBILE STATION

(75) Inventor: Rémi de Montgolfier, Paris (FR)

(73) Assignee: Alcatel, Paris (FR)

( * ) Notice: Subject to any disclaimer, the term of this patent is extended or adjusted under 35 U.S.C. 154(b) by 776 days.

(21) Appl. No.: 09/859,395

(22) Filed: May 18, 2001

(65) Prior Publication Data

US 2002/0004371 A1 Jan. 10, 2002

(30) Foreign Application Priority Data

May 19, 2000 (FR) .................................. 00 06476

(51) Int. Cl.
*H04Q 7/20* (2006.01)
*H04B 17/00* (2006.01)
*H04B 1/00* (2006.01)
*H04B 7/00* (2006.01)

(52) U.S. Cl. .................... 455/436; 455/67.11; 455/68; 455/437; 455/442; 370/331

(58) Field of Classification Search ................ 455/436, 455/437, 552.1, 524, 525, 442, 67.11, 422.1, 455/68; 370/331, 342
See application file for complete search history.

(56) References Cited

U.S. PATENT DOCUMENTS 6,385,437 B1 * 5/2002 Park et al. .................... 455/69
6,597,679 B1 * 7/2003 Willars ....................... 370/342
6,725,038 B1 * 4/2004 Subbiah ...................... 455/436
6,845,238 B1 * 1/2005 Muller ....................... 455/436

FOREIGN PATENT DOCUMENTS

EP 0 892 571 A3 1/1999
WO WO 94/29981 12/1994

* cited by examiner

*Primary Examiner*—Nick Corsaro
*Assistant Examiner*—Raymond B. Persino
(74) *Attorney, Agent, or Firm*—Sughrue Mion, PLLC

(57) ABSTRACT

A method of signaling compressed mode parameters to a mobile station from a mobile radiocommunications network, wherein said compressed mode parameters are signaled by said network to said mobile station together with control parameters for radio measurements to be performed by said mobile station.

9 Claims, 2 Drawing Sheets

FIG_1
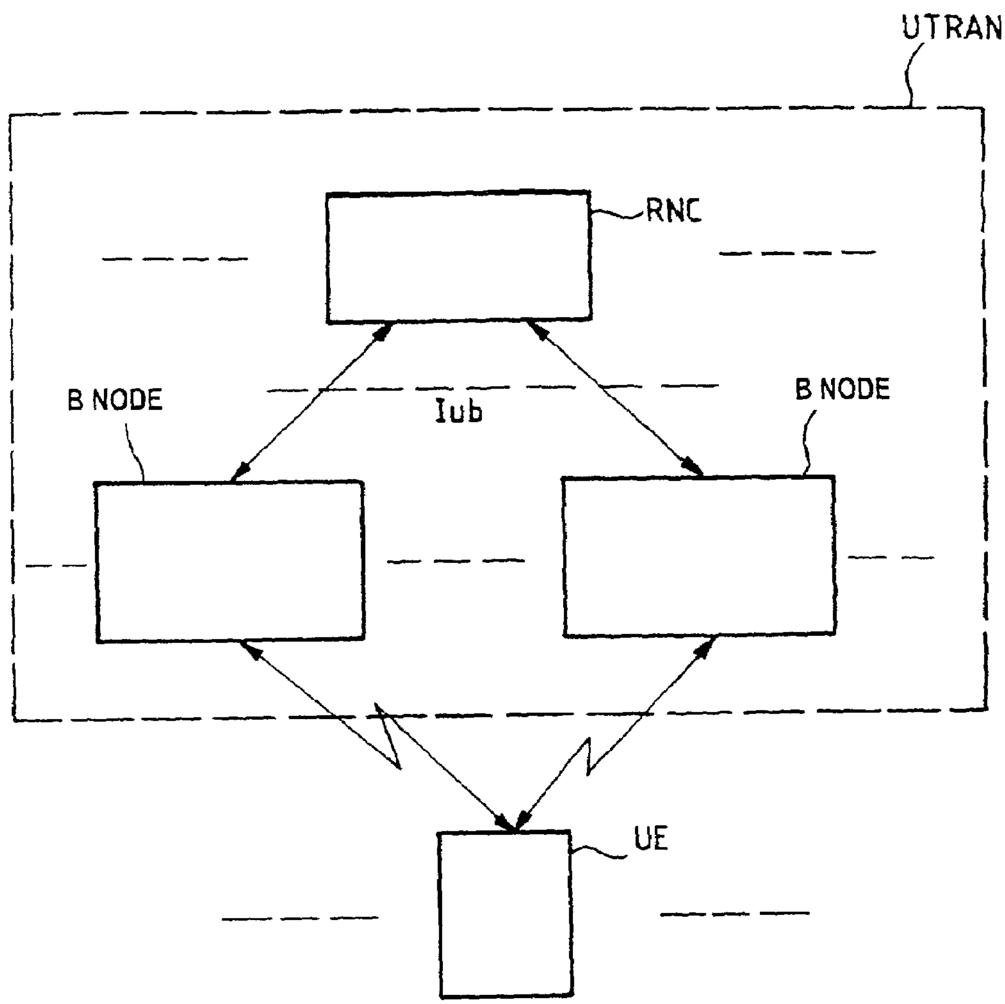

FIG_2
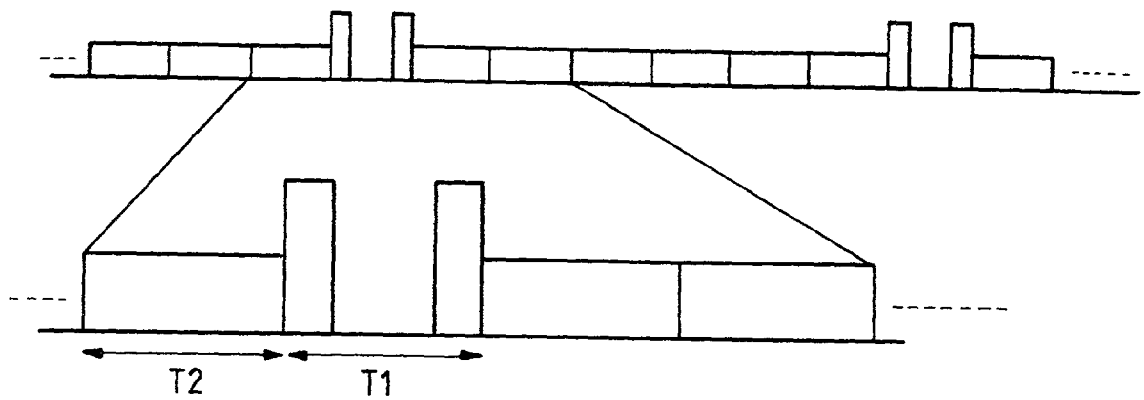
FIG_3

METHOD OF SIGNALING COMPRESSED MODE PARAMETERS TO A MOBILE STATION

The present invention relates in general to mobile radiocommunications systems, and in particular to code division multiple access (CDMA) systems.

BACKGROUND OF THE INVENTION

The CDMA technique is used in particular in so-called third generation systems such as the universal mobile telecommunication system (UMTS) which offer services at data rates higher than those presently offered by so-called second generation systems, such as the global system for mobile communication (GSM) in particular.

In general, and as outlined in FIG. 1, a mobile radiocommunications system comprises a radio access subsystem, itself comprising base stations (also known as "B nodes" in the UMTS), and equipment for controlling the base stations (known as radio network controllers (RNCs) in the UMTS). The system constituted by the B nodes and by the RNCs is known as a UMTS terrestrial radio access network (UTRAN). The UTRAN is in communication firstly with mobile stations (also referred to as user equipment (UE)), and secondly with a network and switching subsystem (not shown).

In general, such systems are of cellular architecture, and "handover" techniques are provided for transferring calls from cell to cell as users move. In addition, a technique that is conventionally used is the technique of mobile-assisted handover (MAHO) in which a mobile station performs radio measurements on control channels broadcast by cells neighboring the cell serving it and reports the results of the radio measurements to the network, so as to make it easier for the network to take decisions concerning handovers.

Another technique commonly used in CDMA systems is the macro-diversity or "soft handover" transmission technique in which a mobile station is connected simultaneously to a plurality of base stations. With suitable techniques for processing and combining various signals received by the mobile station from different base stations (in particular by means of a "rake" type receiver) this makes it possible to improve reception performance and also to minimize the risk of a call being lost during handovers, unlike the "hard" handover technique in which a mobile station is connected at any one instant to only one base station.

When during movements of a mobile station a new cell is added to the set of cells (also referred to as the active set) with which the mobile station is connected using the soft handover technique, the list of cells with which the mobile station needs to perform radio measurements (also known as the neighboring cells) can change. In certain cases, the mobile station can be required to perform radio measurements on a frequency that is different from the frequency currently being used by said active set for the current call.

An example of a situation in which a mobile station can be required to perform radio measurements on a frequency other than the communication frequency currently in use corresponds to the circumstance in which a system such as the UMTS includes two types of cell, cells of the frequency domain duplex (FDD) type operating in a first frequency band using wide-band CDMA (W-CDMA), and time domain duplex (TDD) type cells operating in a second frequency band using time division CDMA (TD-CDMA).

Another example corresponds to the case where a system includes two types of cell, in particular GSM cells and UMTS cells, where UMTS cells are being introduced progressively in an existing infrastructure that corresponds to a GMS system.

Another example corresponds to the case where a CDMA system has different numbers of carrier frequencies allocated to each cell as a function of traffic density in the cell.

Another example corresponds to the case of a CDMA system having a multilayer architecture (made up of macrocells, micro-cells, or indeed pico-cells) and in which different carrier frequencies are allocated to the different layers.

In a CMDA system, to enable a mobile station to perform radio measurements on a frequency other than the frequency in use for the current call in so-called "connected" mode (i.e. using a dedicated physical channel) it is known to use a "compressed" transmission mode in which down-link transmission is interrupted during a given time interval known as a "transmission gap" to allow two mobile stations to perform said measurements, and the data rate is increased outside said time interval in order to compensate for said transmission gap. This is outlined in FIG. 2 which applies to the case where transmitted information is structured as frames, showing a series of successive frames comprising compressed frames (such as T1, for example) and non-compressed frames (such as T2, for example). The data rate can be increased in compressed frames, e.g. by using spreading codes of reduced length, or by increasing the puncturing rate after applying error-correcting encoding to the information to be transmitted.

For greater flexibility, parameters can be varied, and in particular the duration and/or the frequency of transmission gaps can be varied (as a function of various factors such as network configuration, travel speed of the mobile station, radio propagation conditions, . . . , etc.). These parameters are then advantageously signaled to the mobile station by the network.

Thus, in the UMTS, document 3G TS25.212 published by the 3rd Generation Partnership Project (3GPP), the following compressed mode parameters are defined:

- transmission gap period (TGP) i.e. the repetition period for a set of consecutive frames containing up to two transmission gaps;
- transmission gap distance (TGD) or the duration of transmission between two consecutive transmission gaps within a TGP;
- transmission gap length (TGL) for the duration of the transmission gap, including TGL1 as the duration of the first transmission gap within the TGP, and TGL2 for the duration of the transmission gap for the second transmission gap within the TGP; and
- pattern duration (PD) corresponding to the total duration of all of the TGPs.

Document 3G TS25.331 V3.2.0 published by the 3GPP also defines signaling messages in which these compressed mode parameters are transmitted to the UE. In general, these messages are messages transmitted to the UE by the UTRAN while the UTRAN is performing radio resource control (RRC).

It is recalled that in a system such as the UMTS, a plurality of services can be carried simultaneously over a single connection, i.e. a plurality of transport channels can be multiplexed on one or more dedicated physical channels (or spreading codes) allocated to the connection. Radio resources or physical channels are also allocated in flexible manner to different services, as a function of the services required and as a function of various factors such as the radio conditions and/or traffic encountered.

Thus, according to document 3G TS25.331 V3.2.0, the compressed mode parameters are transmitted in the various signaling messages transmitted to the UE by the UTRAN in order to:

confirm a connection request, as applies to messages referred to in that document as RRC connection set-up or RRC connection re-establishment;

set-up, reconfigure, or release (as appropriate) the multiplexing scheme of transport channels on the physical channels, as applies to the messages called in that document "radio bearer set-up", "radio bearer reconfiguration", "radio bearer release"; and reconfigure the transport channels and/or the physical channels, as applies to the messages referred to in that document as "transport channel reconfiguration" and "physical channel reconfiguration".

Reference can also be made to points 10.3.6.17 and 10.3.6.22 in combination together with 10.2.42, 10.2.35, 10.2.29, 10.2.23, 10.2.26, 10.2.51, or 10.2.18, where appropriate of document 3G TS25.331 V3.2.0.

The Applicant has observed that the way in which such messages are used for signaling compressed mode parameters leaves room for improvement.

The main function of such messages is to control radio resources, and they are essentially transmitted from the UTRAN to the UE during changes that occur in the allocation of radio resources to the UE. Unfortunately, this does not necessarily coincide with the instants at which the UE needs to receive compressed mode parameters.

For example, when a new cell is added to the set of cells to which the mobile station is connected using the soft handover technique, the list of neighboring cells on which the mobile station needs to perform radio measurements can change, and in some cases (corresponding in particular to the examples given above), the mobile station can need to make radio measurements on a frequency different from the frequency currently in use for a call. It can then be necessary to signal compressed mode parameters to the mobile station independently of any change in the radio resources allocated to said mobile station.

Similarly, the network can find it necessary to modify the compressed mode parameters, e.g. as a function of one or other of the above-mentioned factors, independently of any change in the radio resources allocated to the UE.

Naturally, these drawbacks could be avoided by retransmitting these radio resource control messages whenever compressed mode parameters are to be transmitted to the UE, even if that does not coincide with a change to the radio resources allocated to the UE. However, since the presence of radio resource allocation information would then be required in each of these messages, this would make it necessary to retransmit such information pointlessly, and therefore would not correspond to effective utilization of available radio resources, or would pointlessly increase the quantity of traffic in the network and thus the overall level of interference.

Conversely, these drawbacks could be avoided by transmitting compressed mode parameters in advance to the UE in such radio resource control messages, even though at that moment the UE only requires radio resource control information, however that is not optimal either, in particular because compressed mode parameters can still change in the time up to the moment at which their transmission to the UE becomes necessary.

In addition, and in general, in a system using mobile-assisted handover, the network also sends control parameters to the mobile station concerning the radio measurements to be performed on adjacent cells.

In a system such as the UMTS, for example, document 3G TS25.331 V3.2.0 thus provides for a special signaling message referred to as "measurement control" for transmitting such radio measurement control parameters from the UTRAN to the UE. The control measurement message specifies, amongst other things, the type of measurements to be performed, and in particular:

intra-frequency measurement, i.e. on a frequency which is the same as that used for the current call;

inter-frequency measurement, i.e. on a frequency which is different from that being used by the current call; and inter-system measurement, i.e. in a system different from that used for the current call (e.g. the GSM system in the example mentioned above).

In addition, the compressed mode parameters can be different depending on the type of measurement, and conversely, for a given type of measurement, it is possible to have a plurality of compressed mode parameters.

Thus, at present, in document 3G TS25.331 V3.2.0, reference must be made in the compressed mode parameters to the type of measurements for which they are intended, thereby leading to an additional degree of complexity.

OBJECTS AND SUMMARY OF THE INVENTION

A particular object of the present invention is to avoid the various drawbacks mentioned above.

In one aspect, the present invention provides a method of signaling compressed mode parameters to a mobile station from a mobile radiocommunications network, wherein said compressed mode parameters are signaled by said network to said mobile station together with control parameters for radio measurements to be performed by said mobile station.

Thus, the signaling of these parameters is optimized and the overall performance of the system is improved.

Advantageously, said compressed mode parameters are signaled together with radio measurement control parameters including the type of radio measurements to be performed, in particular intra-frequency, inter-frequency, or inter-system type measurements.

Thus, a link between the compressed mode parameters and the measurement types can be established in a manner that is much simpler and much more direct than in the prior art outlined above.

In another aspect, the present invention provides a mobile radiocommunications network equipment, including means for transmitting compressed mode parameters to a mobile station in a signaling message containing control parameters for radio measurements to be performed by the mobile station.

Advantageously, said signaling message contains the type of radio measurements to be performed by the mobile station, in particular intra-frequency, inter-frequency, or inter-system type measurements.

Advantageously, in a system such as the UMTS, said signaling message is the "measurement control" message provided for transmitting radio measurement control parameters in that system.

In another aspect, the present invention provides a mobile station, including means for receiving compressed mode parameters in a signaling message which is transmitted thereto by a mobile radiocommunications network, the message containing control parameters for radio measurements to be performed by the mobile station.

Advantageously, said signaling message contains the type of radio measurements to be performed by the mobile station, in particular intra-frequency, inter-frequency, or inter-system type measurements.

Advantageously, in a system such as the UMTS, said signaling message is the "measurement control" message provided for transmitting radio measurement control parameters in that system.

BRIEF DESCRIPTION OF THE DRAWINGS

Other objects and characteristics of the present invention will appear on reading the following description of an embodiment, given with reference to the accompanying drawings, in which:

FIG. 1 outlines the general architecture of a mobile radiocommunications system;

FIG. 2 is a diagram for illustrating the principle of transmission using compressed mode; and FIG. 3 is a diagram for illustrating the method of the invention.

MORE DETAILED DESCRIPTION

As shown in FIG. 3, in a system such as the UMTS, in particular, the invention provides for compressed mode parameters to be signaled by the network (UTRAN) to the mobile station (UE) together with radio measurement control parameters concerning measurements to be performed by the mobile station. In FIG. 3, the compressed mode parameters are referenced MC, the radio measurement control parameters are referenced CMR, and the corresponding signaling message is referenced M.

Thus, in the invention, a mobile station or piece of user equipment UE has means for receiving compressed mode parameters in a signaling message which is transmitted thereto by a mobile radio communications network, containing control parameters for radio measurements to be performed by said mobile station.

Similarly, in the invention, a mobile radio communications network entity such as the RNC and/or a B node has means for transmitting compressed mode parameters to a mobile station in a signaling message containing control parameters for radio measurements to be performed by said mobile station.

The particular implementation of such means presents no special difficulty for the person skilled in the art, and such means do not need to be described herein in greater detail than functionally.

Advantageously, in the UMTS, the message M is the "measurement control" message as provided in said system for transmitting radio measurement control parameters, relating in particular to the type of radio measurements to be performed by the UE, in particular intra-frequency, inter-frequency, or inter-system measurements.

What is claimed is:

1. A method of signaling compressed mode parameters to a mobile station from a mobile radiocommunications network, the method comprising transmitting, from said network to said mobile station, a signaling message containing said compressed mode parameters together with measurement control parameters for radio measurements to be performed by said mobile station.

2. The method according to claim 1, wherein said measurement control parameters indicate whether a type of radio measurements to be performed are intra-frequency, inter-frequency, or inter-system type measurements.

3. The method according to claim 1, wherein said signaling message is a measurement control message.

4. A mobile radiocommunications network equipment configured to transmit to a mobile station a signaling message containing compressed mode parameters and measurement control parameters for radio measurements to be performed by the mobile station.

5. The network equipment according to claim 4, wherein said measurement control parameters indicate whether a type of radio measurements to be performed by the mobile station are intra-frequency, inter-frequency, or inter-system type measurements.

6. The network equipment according to claim 4, wherein said signaling message is a measurement control message.

7. A mobile station configured to receive compressed mode parameters in a signaling message which is transmitted thereto by a mobile radiocommunications network, the signaling message containing measurements control parameters for radio measurements to be performed by the mobile station.

8. The mobile station according to claim 7, wherein said signaling message indicates whether a type of radio measurements to be performed by the mobile station is intra-frequency, inter-frequency, or inter-system type measurements.

9. The mobile station according to claim 7, wherein said signaling message is a measurement control message.

* * * * *